US00RE46485E

(19) United States
(12) Reissued Patent
Augustyn

(10) Patent Number: US RE46,485 E
(45) Date of Reissued Patent: Jul. 25, 2017

(54) AUTOMOTIVE DOOR TRIM MAP POCKET UMBRELLA HOLDER

(71) Applicant: Toyota Motor Corporation, Toyota Aichi (JP)

(72) Inventor: Nicholas H. Augustyn, Ann Arbor, MI (US)

(73) Assignee: Toyota Motor Corporation, Toyota (JP)

(21) Appl. No.: 14/210,405

(22) Filed: Mar. 13, 2014

Related U.S. Patent Documents

Reissue of:
(64) Patent No.: 7,594,686
Issued: Sep. 29, 2009
Appl. No.: 11/842,217
Filed: Aug. 21, 2007

(51) Int. Cl.
*B60R 7/04* (2006.01)
*B60R 7/12* (2006.01)
*B60R 7/08* (2006.01)

(52) U.S. Cl.
CPC ..... *B60R 7/12* (2013.01); *B60R 7/081* (2013.01)

(58) Field of Classification Search
CPC ..... B60R 7/04; B60R 7/046; B60R 7/081; B60R 7/12
See application file for complete search history.

(56) References Cited

U.S. PATENT DOCUMENTS 3,081,126 A * 3/1963 Theberge ..... 296/37.1
3,124,287 A * 3/1964 Belzer ..... 224/311
4,378,888 A * 4/1983 Reed ..... 211/63
4,453,760 A * 6/1984 Hira ..... 296/37.13
4,619,477 A * 10/1986 Kneib et al. ..... 296/37.13
4,795,067 A 1/1989 Hamilton
4,807,920 A 2/1989 Fujiki et al.
5,702,144 A * 12/1997 Matsuura et al. ..... 296/37.13
5,758,811 A * 6/1998 Aumiller et al. ..... 224/563
5,800,004 A * 9/1998 Ackeret ..... 296/37.13
6,116,672 A 9/2000 Cannon et al.
6,120,077 A * 9/2000 Westphal et al. ..... 296/37.13
6,196,606 B1 3/2001 McGoldrick
6,863,329 B2 3/2005 Fero
6,880,874 B1 4/2005 Kallenberger et al.
6,926,332 B2 * 8/2005 Youngs et al. ..... 296/37.13
6,971,698 B1 12/2005 King
7,063,367 B2 6/2006 Wakou et al.
7,192,074 B2 * 3/2007 DePue et al. ..... 296/37.9
7,237,933 B2 * 7/2007 Radu et al. ..... 362/488
7,328,825 B2 * 2/2008 Kaiser ..... 224/543
(Continued)

FOREIGN PATENT DOCUMENTS

DE 3812571 A1 * 10/1989
DE 10039368 A1 * 2/2002
(Continued)

*Primary Examiner* — Sara Clarke
(74) *Attorney, Agent, or Firm* — Dinsmore & Shohl LLP

(57) ABSTRACT

An automotive door comprising a door trim member (10) with a map-receiving pocket (12) that is defined by a back member (16) that is secured to the door trim member and an inner member (14) that is secured to the back member with an umbrella-receiving member (18) that is accessible through the map-receiving pocket and is defined by a U-shaped member (24) that is attached to the door trim member and is adapted to receive an umbrella (20).

8 Claims, 3 Drawing Sheets

AMENDED

(56) References Cited

U.S. PATENT DOCUMENTS

| | | | | |
|---|---|---|---|---|
| 2004/0084922 | A1* | 5/2004 | Park et al. | 296/37.13 |
| 2006/0028043 | A1* | 2/2006 | Zeidman | 296/37.13 |
| 2015/0130207 | A1* | 5/2015 | Bisson | B60R 21/04<br>296/37.1 |

FOREIGN PATENT DOCUMENTS

| | | | | |
|---|---|---|---|---|
| EP | 1798110 | A1 | * | 6/2007 |
| FR | 2898312 | A1 | * | 9/2007 |
| FR | 2956629 | A1 | * | 8/2011 |
| JP | 56050812 | | | 5/1981 |
| JP | 2-164634 | A | * | 6/1990 |
| JP | 08072622 | | | 3/1996 |
| JP | 08099585 | | | 4/1996 |
| JP | 10016651 | | | 1/1998 |
| JP | 2001105983 | | | 4/2001 |
| JP | 2003063249 | | | 3/2003 |
| JP | 2004314826 | A | * | 11/2004 |
| JP | 2005041451 | | | 2/2005 |
| JP | 2006256537 | | | 9/2006 |
| WO | WO 2007006821 | A1 | * | 1/2007 |

* cited by examiner

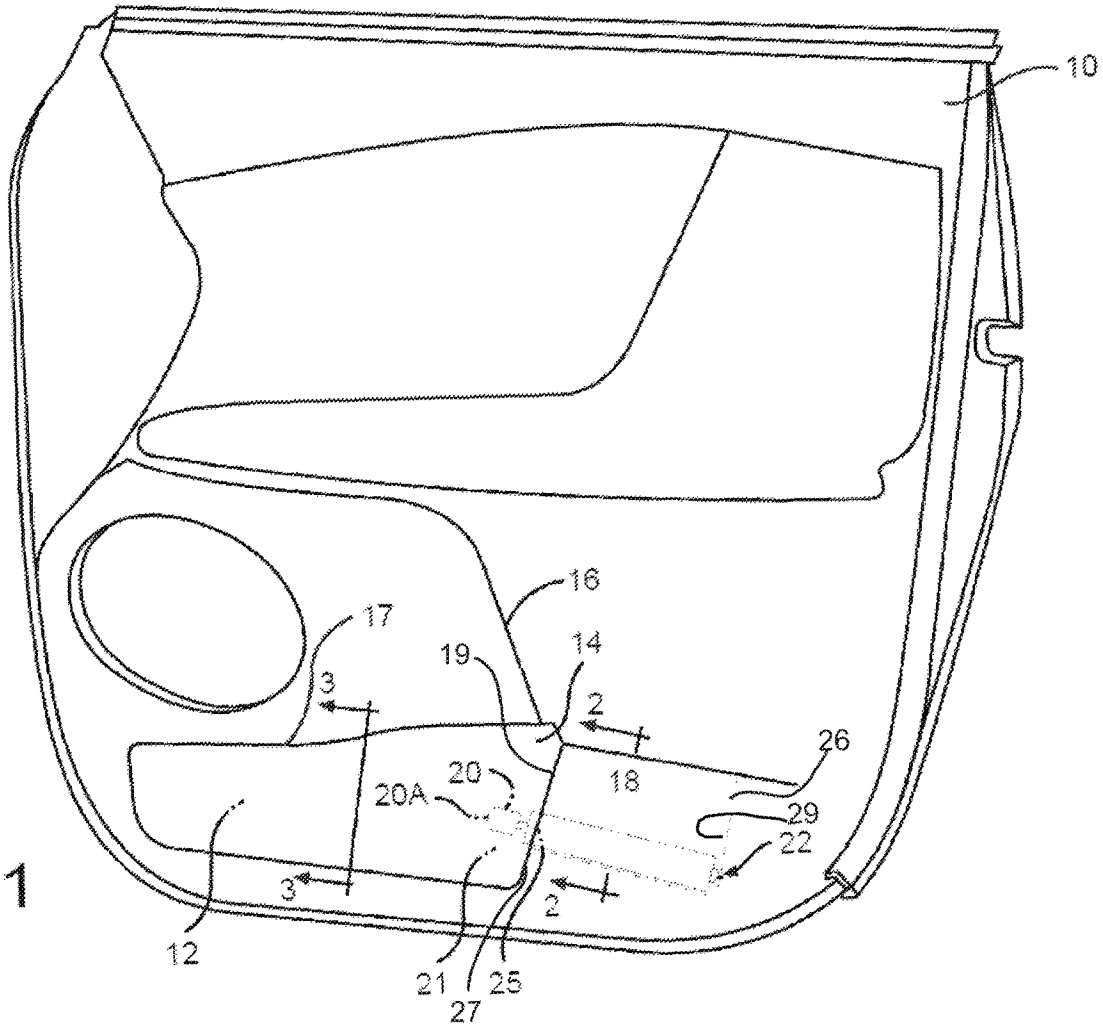
FIG. 1
AMENDED

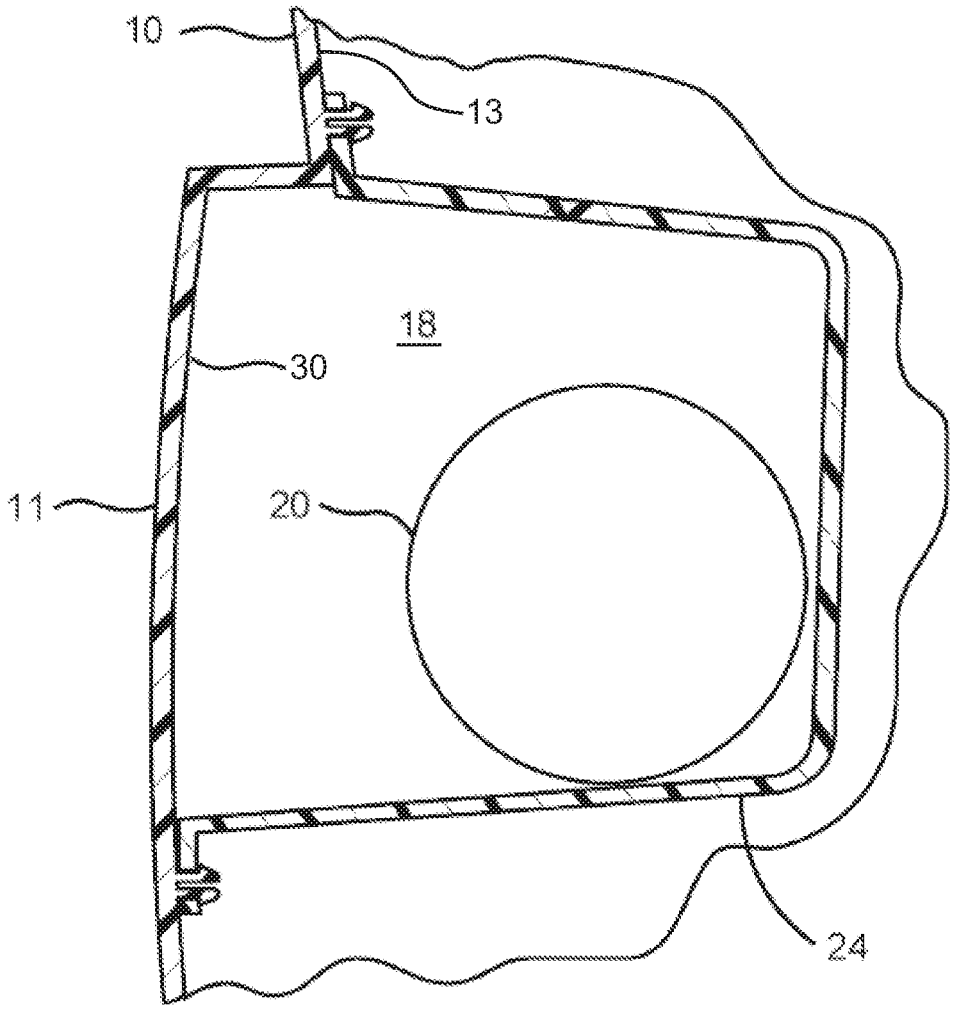
FIG. 2
AMENDED

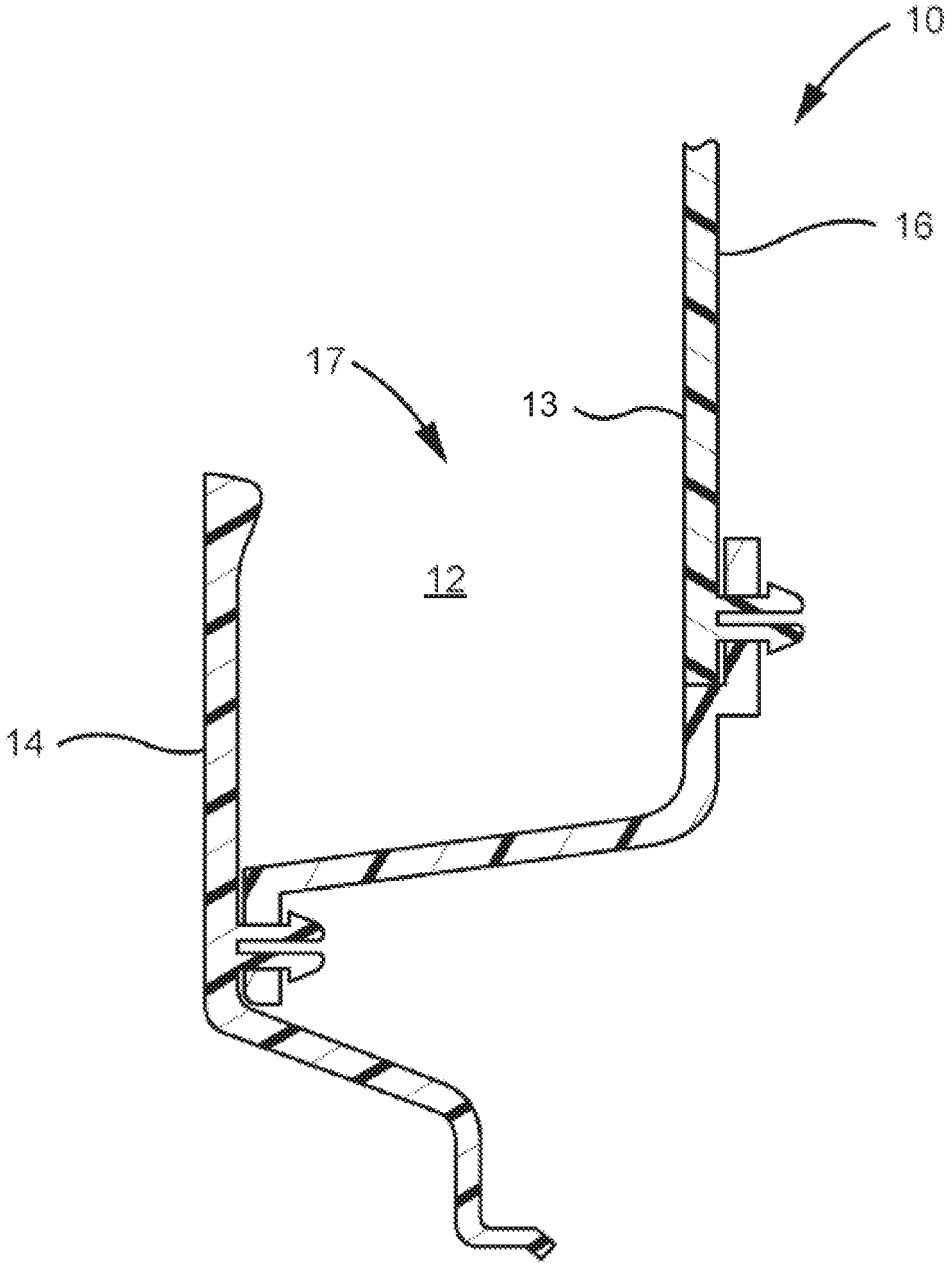
FIG. 3
AMENDED

AUTOMOTIVE DOOR TRIM MAP POCKET UMBRELLA HOLDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This patent application is a reissue application of U.S. Pat. No. 7,594,686, issued Sep. 29, 2009, from U.S. patent application Ser. No. 11/842,217, filed on Aug. 21, 2007.*

FIELD OF THE INVENTION

This invention relates to an automotive door trim map pocket that has a hidden umbrella holder.

BACKGROUND OF THE INVENTION

U.S. Pat. No. 4,807,920 (Fujiki et al.) discloses a passenger automotive vehicle with an umbrella holder that is positioned within inner and outer panels of a rear fender of the vehicle in a chamber that requires a biasing spring or other biasing means to bias the umbrella outwardly from the compartment in which it is stored. The door of the vehicle must be opened before the umbrella can be released, and the requirement for a separate compartment and a spring to outwardly bias the umbrella from the compartment adds to the complexity of the invention and its cost.

U.S. Pat. No. 6,880,874 B1 (Kallenberger et al.) discloses a storage receptacle for use in storing small items, such as eyeglasses, in a map pocket of an automotive door lining. This reference does not disclose or teach that the patented construction can be used to store larger items, such as umbrellas.

BRIEF DESCRIPTION OF THE INVENTION

According to the present invention, appropriate hidden storage for an umbrella is provided in a map pocket that is positioned on an inside of the trim member of an automotive vehicle, the umbrella holder being integrated with the map pocket. The umbrella is readily accessible to an occupant seated next to the door, the driver in the case of a combined map pocket and umbrella holder positioned at the driver's side door, and suitable umbrella storage is provided without any additional elements or assembly operations.

For a further understanding of the present invention, attention is directed to the drawing and the following brief description thereof, to the detailed description of the invention and to the appended claims.

BRIEF DESCRIPTION OF THE DRAWING

FIG. 1 is an elevation view of automotive vehicle door trim member with a combined map pocket and umbrella holder according to the present invention;

FIG. 2 is a sectional view taken on section line 2-2 of FIG. 1; and

FIG. 3 is a sectional view taken on line 3-3 of FIG. 1.

DETAILED DESCRIPTION OF THE INVENTION

An [inside surface of an] automotive door trim member [is indicated by reference numeral] 10 *has an inside surface 11*. A map-receiving pocket [member] 12 *includes an open top 17 and* is defined in the door trim member 10 by an inner member 14 and a back *trim* member 16. The door trim member *10 includes the inside surface 11 and an outer surface 13 and* may be made as separate elements or it may be made as a single, integrated element. *The door trim member 10 includes an aperture 19.* An umbrella-receiving [member] *pocket* 18 that opens *from the aperture 19 through an opening 25* into the *map-receiving* pocket [member] 12. *The umbrella-receiving pocket 18* extends rearwardly from the *map-receiving* pocket [member] 12 and is inclined in a downward direction as it proceeds from the *map-receiving* pocket [member] 12 to utilize gravity to retain an umbrella 20 within the umbrella-receiving [member] *pocket* 18. *The umbrella-receiving pocket 18 is closed at an end 22 that is away from the map-receiving pocket member 12.* The umbrella-receiving [member] *pocket* 18 is formed by a U-shaped member 24 that is secured to an inwardly facing surface of the door trim member 10 [and is closed at an end 22 that is away from the map-receiving pocket member 12]. *The U-shaped member 24 further includes a first end 27 opposite the second or closed end 26. The first end defines the opening 25. The closed end 26 is enclosed by an abutment 29. The U-shaped member 24 encloses a portion 30 of the outer surface 13, thereby defining the umbrella-receiving pocket 18.* The back *trim* member 16 and the U-shaped member *24* may be made as separate elements or they may be made as a single, integrated element.

The longitudinal extent of the umbrella-receiving member 18 is such that an end 20A of the umbrella 20 can be reached by hand from the map pocket member 12 and without the need to open a door to which the door trim member 10 is attached, while at the same time the umbrella-receiving member 18 is hidden from the sight of an adjacent occupant of the vehicle. Nevertheless, the umbrella 20 is readily available to the adjacent occupant if and when it is needed to protect the occupant from a rainfall while exiting the associated vehicle. Attachment of the inner member 14 to the back member 16 may be by heat staking, if using heat-stakeable components, by threaded fasteners or by snap attachments, as may be the attachment of the umbrella-receiving member 24 to the door trim member 10.

The best mode known to the inventor for carrying out the present invention as of the filing date hereof has been shown and described herein, but it will be apparent to those skilled in the art that suitable modifications, variations and equivalents may be made without departing from the scope of the invention, such scope being limited solely by the terms of the following claims and the legal equivalents thereof.

The invention claimed is:

1. An automotive door comprising:

a door trim member having an inside surface, an outer surface opposite the inside surface, and an aperture;

a map-receiving pocket disposed on the inside surface of the door trim member, the map-receiving pocket having [a] *an* open top, and wherein a portion of the map-receiving pocket is in communication with the aperture;

an umbrella-receiving pocket disposed on the outer surface of the door trim member so as to be hidden from the view of the vehicle occupant by the door trim member, the umbrella-receiving pocket having an opening opposite a closed end *opposite the aperture*, and wherein the opening is in communication with the aperture so as to allow an umbrella to be passed through the open top of the map-receiving pocket and the aperture into the umbrella-receiving pocket.

2. The automotive door according to claim 1 wherein:

the umbrella-receiving pocket extends downwardly as it proceeds away from the map-receiving pocket so as to allow gravity to assist in retaining an umbrella in the umbrella-receiving pocket.

3. The automotive door according to claim 1 wherein the umbrella-receiving pocket and the door trim member are made as separate elements.

[4. The automotive door according to claim 1 wherein the umbrella-receiving pocket and the door trim member are made as a single, integrated element.]

5. The automotive door according to claim 1 further including a u-shaped member enclosing a portion of the outer surface so as to define the umbrella-receiving pocket, the u-shaped member has a first end opposite a second end, wherein the first end is in communication with the open side and the second end is enclosed by an abutment.

6. The automotive door according to claim 1 wherein the door trim member and the umbrella-receiving pocket are manufactured from heat-stakeable materials and wherein the umbrella-receiving pocket is secured to the outer surface by heat staking.

7. The automotive door according to claim 1 wherein the door trim member is secured to the vertical wall by threaded fasteners.

[8. The automotive door according to claim 5 wherein the generally U-shaped member and the back trim member are manufactured from heat-active materials, and the U-shaped member is secured to the outer surface by heat staking.]

9. The automotive door according to claim 5 wherein the umbrella-receiving pocket is secured to the outer surface by threaded fasteners.

10. The automotive door according to claim 5 wherein the generally U-shaped member is secured to the outer surface by snap attachments.

* * * * *